United States Patent [19]
Okita et al.

[11] Patent Number: 4,980,199
[45] Date of Patent: Dec. 25, 1990

[54] PROCESS FOR PRODUCING A MAGNETIC RECORDING MEDIUM

[75] Inventors: Tsutomu Okita; Yutaka Kakuishi, both of Kanagawa, Japan

[73] Assignee: Fuji Photo Film Co., Ltd., Kanagawa, Japan

[21] Appl. No.: 537,725

[22] Filed: Jun. 14, 1990

[30] Foreign Application Priority Data

Jun. 15, 1989 [JP] Japan .................... 1-152933

[51] Int. Cl.$^5$ .................... B05D 5/12; H01F 10/02
[52] U.S. Cl. .................... 427/128; 428/695; 428/900
[58] Field of Search .................... 427/128–132, 427/48; 428/695, 900

Primary Examiner—Bernard Pianalto
Attorney, Agent, or Firm—Sughrue, Mion, Zinn, Macpeak & Seas

[57] ABSTRACT

A process for producing a magnetic recording medium is disclosed, comprising steps of (1) kneading ferromagnetic fine powders and binders with solvents, (2) optionally adding further the binders and the solvents to disperse the powders and (3) coating the resulting magnetic coating composition on a non-magnetic support, wherein the ferromagnetic fine powders have a crystallite size of not larger than 500 Å, the binders have at least one polar group selected from the group consisting of —$SO_3M$, —$OSO_3M$, —$PO_3M_2$, —$OPO_3M_2$ and —COOM (wherein M is hydrogen atom, an alkali metal or ammonium) and at least one epoxy group in the molecule and a step of adding a fatty acid having 12 to 26 carbon atoms is carried out after the dispersing step (2). Preferably, a step of crushing the ferromagnetic powders is additionally carried out before the kneading step (1).

7 Claims, No Drawings

PROCESS FOR PRODUCING A MAGNETIC RECORDING MEDIUM

FIELD OF THE INVENTION

This invention relates to a process for producing a magnetic recording medium comprising a non-magnetic support having thereon a magnetic layer composed of a ferromagnetic fine powder dispersed in a binder, and more particularly to a process for producing a magnetic recording medium which is excellent in running properties and durability and has good electromagnetic transduction characteristics.

BACKGROUND OF THE INVENTION

A demand for high-density recording has been increased in the field of the magnetic recording medium. In order to meet the demand, it is necessary that the particle size of the ferromagnetic fine powder is made much finer, the dispersibility of the ferromagnetic fine powder is improved, the surface properties of the magnetic layer are improved and the filling degree of the ferromagnetic fine powder is improved.

JP-B-58-41565 (the term "JP-B" as used herein means an examined Japanese patent publication"), JP-A-57-44227 (the term "JP-A" as used herein means an "unexamined published Japanese patent application"), JP-A-59-30235, JP-A-60-238306, JP-A-60-238309 and JP-A-60-238371 disclose the use of binders having a polar group such as $-SO_3M$, $-OSO_3M$, $-PO_3M_2$, $-O-PO_3M_2$, $-COOM$ or the like or binders having the polar group and an epoxy ring to improve the dispersibility of the ferromagnetic fine powder.

These binders have high adsorptivity to the ferromagnetic fine powder and good dispersibility can be imparted in comparison with conventional binders having only a polar group. However, even when these good binders are used, the finer the particle size of the ferromagnetic powder for the purpose of high-density recording the more difficult its dispersion. Accordingly, it is highly demanded to develop a method which allows the performance of highly dispersible binders to be exhibited.

JP-A-60-147931, JP-A-60-187931 and JP-A-62-143230 disclose methods wherein the addition stage of lubricants such as fatty acids are carried out after the dispersion stage of the ferromagnetic fine powder in the binders. However, magnetic recording mediums having high electromagnetic properties and improved dispersibility of ferromagnetic fine powder having a crystallite size of not larger than 500 Å in particular can not be obtained by these methods. The effect on the fineness of the ferromagnetic powder for high-density recording in particular is not exhibited.

In the methods described in the above patent specifications, durability and running properties are insufficient and further deteriorated particularly when the surface of the magnetic layer is smoothed to improve electromagnetic properties.

JP-A-62-143230 proposes a process for producing a magnetic recording medium comprising a step of dispersing ferromagnetic powder in a solution containing a binder having sulfo group or phospho group in the form of an alkali metal salt, a step of adding a fatty acid to the resulting dispersion and coating the resulting magnetic coating solution.

Since sulfo group and/or phospho group are/is in the form of an alkali metal salt, the dispersibility of ferromagnetic powder is improved and the surface smoothness of the magnetic layer is improved. Further, since the fatty acid is added to the dispersion of the ferromagnetic powder, the fatty acid is not adsorbed by the ferromagnetic powder and stable running properties can be obtained.

However, when ferromagnetic fine powder having a crystallite size of not larger than 500 Å is used, it has been found the S/N can not be satisfactorily improved, $\mu$ value is high and still durability is not sufficient.

SUMMARY OF THE INVENTION

An object of the present invention is to provide a process for producing a magnetic recording medium which has very good electromagnetic properties and is excellent in durability as well as running properties by using ferromagnetic fine powder having very small crystallite size and highly dispersing the powder.

Another object of the present invention is to provide a process for producing a magnetic recording medium which allows time required for dispersion to be shortened and allows manufacturing cost to be reduced.

The above-described objects of the present invention have been achieved by providing a process for producing a magnetic recording medium comprising (1) a step of kneading ferromagnetic fine powders and binders with solvents, optionally (2) a step of adding further the binders and the solvents to disperse the powders and (3) coating the resulting magnetic coating composition on a non-magnetic support, wherein the ferromagnetic fine powders have a crystallite size of not larger than 500 angstrom (Å), the binders have at least one polar group selected from the group consisting of $-SO_3M$, $-OSO_3M$, $-PO_3M_2$, $-OPO_3M_2$ and $-COOM$ (wherein M is hydrogen atom, an alkali metal or ammonium) and at least one epoxy ring in the molecule and a step of adding a fatty acid having 12 to 26 carbon atoms is carried out after the dispersing step (2). More preferably, said process for producing a magnetic recording medium comprises additionally a step of crushing the ferromagnetic powder before the kneading step (1).

DETAILED DESCRIPTION OF THE INVENTION

In the present invention, a very fine ferromagnetic powder having a crystallite size of not larger than 500 Å is kneaded with a binder having a polar group such as $-SO_3M$, $-OSO_3M$, $-PO_3M_2$, $-OPO_3M_2$ or $-COOM$ and an epoxy ring (i.e., epoxy group) in the molecule to disperse the powder in the binder. Said polar group is easily adsorbed by the ferromagnetic fine powder and the binder contains the epoxy group so that highly dispersion can be achieved. When a fatty acid is added to the magnetic coating composition after kneading and dispersion, lubricating characteristics can be remarkably improved while the dispersibility of the ferromagnetic fine powder is maintained. The reason why the fatty acid is added after kneading and dispersion is that when the fatty acid is added during kneading and dispersion, the epoxy group of the binder is opened by the presence of the fatty acid, that is, the fatty acid interferes with the inherent effect due to the epoxy group and there is caused a problem with regard to thickening. The present invention is freed from the above-described problem. Further, since the fatty acid is added in the latter stage, the fatty acid is not adsorbed by the ferromagnetic fine powder, but the polar group of the binder is adsorbed by the ferromagnetic fine powder, dispersibility is improved and $\mu$ values and still durability are greatly improved.

In the kneading step and dispersion step of the present invention, the above-described binder and solvent are kneaded with the ferromagnetic fine binder in a grinder, a roll mill or a kneader and then dispersed. For dispersion, a sand mill, a ball mill, an attritor or Henschel mixer can be used. The binder may be dissolved in the solvent and then placed in said device. Alternatively, the binder and the solvent may be separately placed in said device.

Since the ferromagnetic fine powder causes secondary agglomeration by its own magnetic character, it is necessary to crush mechanically the powder. When the crushing step is carried out, the effect of the present invention can be further enhanced. The crushing step can be carried out by using a Simpson mill (manufactured by Shinko Kogyo K. K.), a sand mill (Matsumoto Chuzo Kogyo K. K.), a sand grinder, a two-roll mill, a three-roll mill, an open kneader, a press kneader, a continuous kneader, a Henschel mixer or a flat mill. It is preferred that the crushing step has the same equipment as that used in the kneading step, because a transfer step can be omitted. It has been found that when the crushing step is carried out, dispersion time can be shortened and dispersibility can be further improved.

Examples of the ferromagnetic fine powder which can be used in the present invention include ferromagnetic alloy powder, ferromagnetic fine iron oxide powder, Co-doped ferromagnetic fine iron oxide powder, ferromagnetic fine chromium dioxide powder and barium ferrite. Preferably ferromagnetic alloy powder, Co-doped ferromagnetic fine powder, ferromagnetic iron oxide and chromium dioxide powder have an acicular ratio of generally from 2/1 to 20/1, preferably from 5/1 to 20/1 and an average length of the long axis is generally from 0.2 to 2.0 $\mu$m. The ferromagnetic fine powder of the present invention has a crystallite size of not larger than 500 Å, preferably not larger than 400 Å, more preferably not larger than 300 Å (crystallite size was measured by X-ray diffraction method). When the crystallite size is the size described above according to the purpose of the present invention, effects of improving electromagnetic properties, running properties and durability can be exhibited by the technique of the present invention. The ferromagnetic alloy powder has a metal content of at least 75 wt %, and at least 80 wt % of the metallic component is at least one ferromagnetic metal or alloy particle (e.g., Fe, Co, Ni, Fe-Ni, Co-Ni, Fe-Co-Ni).

Preferred examples of the binder having at least one polar group selected from the group consisting of —SO$_3$M, —OSO$_3$M, —PO$_3$M$_2$, —OPO$_3$M$_2$ and —COOM (wherein M is H, an alkali metal or ammonium) and at least one epoxy group (i.e., epoxy ring) in the molecule of binder which can be used in the present invention include vinyl chloride polymers and copolymers such as vinyl chloride-vinyl acetate copolymer, vinyl chloride-vinyl propionate copolymer, vinyl chloride-vinylidene chloride copolymer, vinyl chloride-acrylic ester copolymer and vinylidene chloride-vinyl acetate copolymer. Among these, a vinyl chloride copolymer and a vinyl chloride-vinyl acetate copolymer are more preferred as the binder and further vinyl chloride-glycidyl (meth)acrylate copolymer and vinyl chloride-vinyl acetate-glycidyl (meth)acrylate copolymer are most preferred as the binder. Preferred polar groups are —SO$_3$M and —CO$_2$M with —SO$_3$M being more preferred. The content of the polar group is preferably from $1 \times 10^{-7}$ to $1 \times 10^{-3}$ equivalent, more preferably from $1 \times 10^{-5}$ to $5 \times 10^{-4}$ equivalents per gram of the polymer for binder. When the content of the group is outside the range defined above, the dispersibility of the ferromagnetic fine powder becomes poor and electromagnetic properties are seriously reduced. The binder must have one group selected from these polar groups. If desired, the binder may have two or more polar groups. When the binder has —OH group, dispersibility can be effectively improved.

The content of the epoxy ring is in the range of from $1 \times 10^{-4}$ to $1 \times 10^{-2}$ preferably from $5 \times 10^{-4}$ to $5 \times 10^{-2}$ mol per gram of the polymer for binder. The polymer for binder has a weight-average molecular weight of from 20,000 to 100,000, preferably from 30,000 to 80,000. When the molecular weight is outside the range described above, dispersibility becomes poor or durability is deteriorated.

The binders can be synthesized by modifying a part of hydroxyl groups formed by an addition reaction to a vinyl chloride-glycidyl (meth)acrylate copolymer or saponifying a vinyl chloride-vinyl acetate copolymer. Alternatively, these binders may be prepared according to the methods described in JP-A-60-238306, JP-A-60-38309 and JP-A-60-238371. Resins which can be polymerized and hardened by the irradiation of a radiation such as electron beam as described in JP-A-61-9207, JP-A-61-106605, JP-A-57-40744, JP-A-59-8126, JP-A-62-112665 and JP-A-62-112668 can also be used.

Fatty acids having from 12 to 26 carbon atoms, preferably from 14 to 20 carbon atoms (in total) are preferred from the viewpoints of improving effectively running properties and durability. Preferred examples of the fatty acids which are used in the present invention include lauric acid, myristic acid, palmitic acid, stearic acid, isostearic acid, oleic acid, linoleic acid, linolenic acid, eicosanic acid, elaidic acid and behenic acid. Among these, a myristic acid, a palmitic acid and a stearic acid are preferred.

The fatty acid is added just before coating after the preparation of the dispersion by using a one rod roll dispersion mixer, a two rod roll dispersion mixer, a sand mill, a ball mill or a high-speed mixer.

A hardening agent can be used as a part of the binder in the present invention. The hardening agent can be added simultaneously with the addition of the fatty acid. The fatty acid is added to the dispersion at generally about 15 hours, preferably about 5 hours before coating.

The amount of the fatty acid to be added is preferably from 0.5 to 10% by weight, particularly preferably from 1.0 to 5.0% by weight based on the amount of the ferromagnetic fine powder. When the amount of the fatty acid is more than the upper limit defined above, an excess lubricant exists on the surface of the magnetic layer, and troubles such as sticking during running on a tape deck are caused. In addition thereto, there is caused a problem that durability is lowered by an action of plasticizing the binder in the magnetic layer. When the amount of the fatty acid is less than the lower limit defined above, running properties are insufficient and the effect of the use of the fatty acid can not be obtained.

Other lubricants may be allowed to coexist in the present invention. Examples of the lubricants which can be allowed to coexist in the present invention include fatty acid amides, fatty acid esters, (various monoesters, fatty acid esters of polyhydric alcohols such as sorbitan and glycerine, fatty acid esters with polybasic acids), metallic soaps, higher aliphatic alcohols, monalkyl phosphates, dialkyl phosphates, trialkyl phosphates, paraffins, silicon oils, fatty acid-modified silicone compounds, fluorine-containing oils, esters having perfluoroalkyl groups, silicone compounds having perfluoroalkyl groups, animal and vegetable oils, mineral oils, higher aliphatic amines and fine powders of inorganic compounds such as graphite, silica molybdenum disulfide and tungsten disulfide.

Among these lubricants, there are preferred fatty acid amides having from 10 to 22 carbon atoms, fatty acid esters having from 22 to 36 carbon atoms, esters having a perfluoroalkyl groups having 6 carbon atoms or more and silicone compounds having perfluoroalkyl group having 6 carbon atoms or more.

Other resins may further be added to the above-described binders which can be used in the present invention. Examples of such resins include vinyl chloride-vinyl acetate copolymer, copolymers of vinyl chloride and vinyl alcohol, maleic acid and/or acrylic acid, vinyl chloride-vinylidene chloride copolymer, vinyl chloride-acrylonitrile copolymer, ethylene-vinyl acetate copolymer, cellulose derivatives such as nitrocellulose resin, acrylic resins, polyvinyl acetal resin, polyvinyl butyral resin, epoxy resin, phenoxy resin and polyurethane resin. Among them, most preferred are polyurethane resins formed by introducing polar groups (epoxy group and at least one selected from the group consisting of $-CO_2H$, $-OH$, $-NH_2$, $-SO_3M$, $-OSO_3M$, $-PO_3M_2$ and $-OPO_3M_2$ wherein M is hydrogen atom, an alkali metal or ammonium) to further enhance dispersibility and durability. These polyurethane resins are described in JP-A-57-165464, JP-B-58-41565, JP-A-62-40615 and JP-A-5930235. The content of the polar group is in the range of preferably from $1 \times 10^{-5}$ to $1 \times 10^{-3}$ equivalents per gram of the polymers (i.e., polyurethane resins). The skeleton of the polymers (i.e., polyurethane resins) may be any of polyester, polyether, polyester-ether and polycarbonate. The above-described high-molecular binders may be used either alone or as a mixture of two or more of them. The binders are often hardened with conventional isocyanate crosslinking agents (e.g., tolylene diisocyanate tri-adduct of trimethylol propane.

Further, radiation-curable binders comprising an acrylic ester oligomer and a monomer can also be used.

The content of the total binder in the magnetic layer of the magnetic recording medium of the present invention is generally from 10 to 100 parts by weight, preferably from 15 to 30 parts by weight per 100 parts by weight of the ferromagnetic fine powder.

Examples of organic solvents which can be used in kneading, dispersion and coating of the magnetic coating composition of the present invention include ketones such as acetone, methyl ethyl ketone, methyl isobutyl ketone and cyclohexanone; esters such as methyl acetate, ethyl acetate, butyl acetate, ethyl lactate and glycol monoethyl ether of acetic acid; ethers such as ethyl ether, glycol dimethyl ether, glycol monoethyl ether, dioxane and tetrahydrofuran; aromatic hydrocarbons such as benzene, toluene and xylene; and chlorinated hydrocarbons such as methylene chloride, ethylene chloride, carbon tetrachloride, chloroform, ethylene chlorohydrin and dichlorobenzene.

The magnetic coating composition of the present invention may further contain additives such as abrasives, dispersing agents, antistatic agents and rust preventing agents.

Any of abrasives having a Mohs' hardness of 5 or more, preferably 8 or more can be used without particular limitation. Examples of the abrasives having a Mohs' hardness of 5 or more include $Al_2O_3$ (Mohs' hardness 9), $TiO_2$ (Mohs' hardness 6), $TiO_2$ (Mohs' hardness 6.5), $SiO_2$ (Mohs' hardness 7), $SnO_2$ (Mohs' hardness 6.5), $Cr_2O_3$ (Mohs' hardness 9) and $\alpha\text{-}Fe_2O_3$ (Mohs' hardness 5.5). These abrasives may be used either alone or as a mixture of two or more of them. Abrasives having a Mohs' hardness of at least 8 are particularly preferred. When an abrasive having a Mohs' hardness of lower than 5 is used, the abrasive is liable to drop out from the magnetic layer and the abrasive has scarcely an action of abrading head so that head is liable to be clogged and running durability becomes poor. The content of the abrasive is in the range of generally from 0.1 to 20 parts by weight, preferably from 1 to 10 parts by weight, per 100 parts by weight of the ferromagnetic fine powder. Carbon black having an average particle size of particularly preferably from 10 to 300 nm (nano meter) is preferred as the antistatic agent.

The magnetic layer can be coated on the non-magnetic support by an air doctor coating, a blade coating, a rod coating, an extrusion coating, an air knife coating, a squeeze coating, a dip coating, a reverse roll coating, a transfer roll coating, a gravure coating, a kiss roll coating, a cast coating, a spray coating or a spin coating. Other methods can also be used. Details are described in *Coating Engineering*, pp. 253 to 277, published by Asakura Shoten, Mar. 20, 1971.

Examples of materials for the non-magnetic support to be coated with the magnetic coating composition include polyesters such as polyethylene terephthalate and polyethylene 2,6-naphthalate; polyolefins such as polyethylene and polypropylene; cellulose derivatives such as cellulose triacetate; plastics such as polycarbonates, polyimides and polyamido-imide; non-magnetic metals such as aluminum, copper, tin, zinc and non-magnetic alloys of these metals; and plastics deposited with metals such as aluminum. The non-magnetic support has a thickness of from 3 to 100 $\mu$m. In the case of magnetic tape, the thickness if from 3 to 20 $\mu$m. In the case of magnetic disc, the thickness is from 20 to 100 $\mu$m.

The non-magnetic support may be in any form of a film, a tape, a sheet, a disc, a card and a drum. Desired materials can be chosen according to the forms.

The non-magnetic support of the present invention may be provided with a back coat on the surface (back surface) opposite to the side of the magnetic layer for the purpose of imparting antistatic properties, preventing transfer, wow and flutter from being caused, improving the strength of the magnetic recording medium and allowing the back surface to serve as a mat.

According to the present invention, the fatty acid is added just before coating to thereby enable the dispersing ability of the compound having the polar group and the epoxy group as the binder capable of improving dispersibility to be exhibited as much as possible, whereby an adverse effect caused by the fatty acid can be prevented from being caused. Another effect obtained by the present invention is such that the fatty acid is prevented from being adsorbed by the ferromagnetic fine powder and the binder is prevented from being plasticized to thereby enable the lubricating performance of the fatty acid to be exhibited as much as possible and to improve the running properties and durability of the magnetic recording medium. Still another effect obtained by the present invention is such that the reaction of the epoxy ring of the binder with the fatty acid is prevented from taking place and the performance of the fatty acid as the lubricant can be exhibited. Namely, when the binder having the epoxy ring is allowed to coexist with fatty acid in the dispersion step, the ring opening reaction of the epoxy ring takes place and there is caused a problem that the magnetic coating composition is sticky before coating and can not be filtered or coated. The present invention is freed from this problem.

In the present invention, the ferromagnetic powder having a crystallite size of as fine as not larger than 500 Å and the binder having the polar group and the epoxy ring int he molecule are used. Hence, the powder is highly dispersed by easy adsorption of the polar group and the presence of the epoxy group having an effect of improving dispersibility. Further, the fatty acid is not allowed to exist in the magnetic coating composition during kneading and dispersion. Accordingly, there is no possibility that the fatty acid is adsorbed by the ferromagnetic powder, the amount of the fatty acid used as the lubricant is reduced and the fatty acid is replenished. Therefore, there are not caused problems that plasticization takes place, the epoxy ring of the binder is opened by the fatty acid and the magnetic coating composition is thickened. High S/N, low $\mu$ value and long still durability time can be ensured.

The present invention is now illustrated in greater detail by reference to the following examples which, however, are not to be construed as limiting the invention in any way. In the following examples, parts are by weight unless otherwise specified.

The process for producing the magnetic recording medium of the present invention is illustrated by the following examples.

EXAMPLE 1

100 parts of ferromagnetic alloy powder (composition: Fe 94%, Zn 4%, Ni 2%; Hc: 1500 Oe; crystallite size: 200 Å) was crushed in an open kneader for 10 minutes and then kneaded with 10 parts of a compound ($SO_3Na = 6 \times 10^{-5}$ eq/g, epoxy $= 1 \times 10^{-3}$ eq/g, MW = 30,000) obtained by adding sodium hydroxyethylsulfonate to a copolymer of vinyl chloride/vinyl acetate/glycidyl methacrylate = 86/9/5 and 60 parts of methyl ethyl ketone for 60 minutes. Subsequently, the following ingredients were added thereto.

| | |
|---|---|
| Urethane resin having —SO$_3$Na group (UR8200, a product of Toyobo Co., Ltd.) | 10 parts (on a solid basis) |
| Abrasive (Al$_2$O$_3$; particle size: 0.3 μm) | 2 parts |
| Carbon black (particle size: 40 mμ) | 2 parts |
| Methyl ethyl ketone/toluene = 1/1 | 200 parts |

The mixture were dispersed in sand mill for 120 minutes. Further, the following ingredients were added thereto.

| | |
|---|---|
| Polyisocyanate (Coronate 3041, a product of Nippon Polyurethane Co., Ltd.) | 5 parts (on a solid basis) |
| Stearic acid | 1 part |
| Butyl stearate | 1 part |
| Methyl ethyl ketone | 50 parts |

The mixture was mixed with stirring for 20 minutes and then filtered through a filter having an average pore size of 1 μm to obtain a magnetic coating composition. The resulting magnetic coating composition was coated on the surface of a polyethylene terephthalate support of 10 μm in thickness by means of reverse roll coating in such an amount as to give a dry thickness of 3.0 μm.

The resulting magnetic coating composition-coated non-magnetic support, under the condition of undrying was subjected to magnetic field orientation by using a magnet of 3000 gause, dried, super-calendered and slit into a tape of 8 mm in width to prepare a 8 mm video tape.

In the same way as in Example 1 the following experiments were made. The results of evaluation of the obtained tapes are shown in Table 1.

EXAMPLE 2

The same procedure as in Example 1 was repeated except that stearic acid was added in the dispersion stage.

EXAMPLE 3

The same procedure as in Example 1 was repeated except that a vinyl chloride/vinyl acetate/3-allyloxy-2-hydroxypropane sulfonate copolymer (—SO$_3$Na $6 \times 10^{-5}$ eq/g, no epoxy group, MW = 30,000) was used in place of the compound obtained by adding sodium hydroxyethylsulfonate to the copolymer of vinyl chloride,/vinyl acetate/ glycidyl methacrylate (86/9/5).

EXAMPLE 4

The same procedure as in Example 1 was repeated except that the copolymer of vinyl chloride/vinyl acetate/ glycidyl methacrylate (86/9/5) as such was used.

EXAMPLE 5

The same procedure as in Example 4 was repeated except that stearic acid was added in the dispersion stage.

EXAMPLE 6

The same procedure as in Example 1 was repeated except that a copolymer of vinyl chloride/vinyl acetate/maleic acid (92/4/4) was used in place of the compound obtained by adding sodium hydroxyethylsulfonate to the copolymer of vinyl chloride/vinyl acetate/glycidyl methacrylate (86/9/5).

EXAMPLE 7

The same procedure as in Example 3 was repeated except that stearic acid was added in the dispersion stage.

EXAMPLE 8

The same procedure as in Example 1 was repeated except that a compound (—SO$_3$Na $= 4 \times 10^{-4}$ eq/g, epoxy $= 4 \times 10^{-3}$ eq/g, MW = 30,000) was used as the compound obtained by adding sodium hydroxyethylsulfonate to the copolymer of vinyl chloride/vinyl acetate/glycidyl methacrylate (86/9/5).

EXAMPLE 9

The same procedure as in Example 1 was repeated except that a compound ($-SO_3Na=4\times10^{-5}$ eq/g, epoxy=$8\times10^{-4}$ eq/g, MW=30,000) was used as the compound obtained by adding sodium hydroxyethylsulfonate to the copolymer of vinyl chloride/vinyl acetate/glycidyl methacrylate (86/9/5).

EXAMPLE 10

The same procedure as in Example 1 was repeated except that Co-doped $\gamma$-iron oxide (Hc: 900 Oe, crystallite size: 250 Å) was used in place of the ferromagnetic alloy powder.

EXAMPLE 11

The same procedure as in Example 10 was repeated except that stearic acid was added in the dispersion stage for the purpose of comparison.

EXAMPLE 12

The same procedure as in Example 1 was repeated except that ferromagnetic alloy powder having a crystallite size of 400 Å was used.

EXAMPLE 13

The same procedure as in Example 1 was repeated except that ferromagnetic alloy powder having a crystallite size of 600 Å was used.

TABLE 1

| Example | S/N (db) | $\mu$ Value | Still Durability Time (min) |
|---|---|---|---|
| 1 (Invention) | +2.5 | 0.27 | at least 30 |
| 2 | +0.0 | 0.35 | 18 |
| 3 | −1.2 | 0.32 | 7 |
| 4 | −1.8 | 0.45 | 18 |
| 5 | −1.5 | 0.36 | 8 |
| 6 | −1.3 | 0.33 | 10 |
| 7 | −1.8 | 0.36 | 5 |
| 8 (Invention) | +2.0 | 0.28 | at least 30 |
| 9 (Invention) | +2.2 | 0.29 | at least 30 |
| 10 (Invention) | +3.2 | 0.24 | at least 30 |
| 11 | +0.0 | 0.33 | 13 |
| 12 (Invention) | +1.5 | 0.25 | at least 30 |
| 13 | −3.5 | 0.25 | 19 |

Evaluation Method (1) Electromagnetic Properties

A signal of 7 MHz was recorded on the thus obtained video tape by using VTR ("FUJIX-8", manufactured by Fuji Photo Film Co., Ltd.) and reproduced. The reproduced output of 7 Mz recorded on the standard tape (Example 2) was referred to as 0dB. The relative reproduced output of each video tape was measured.

Each of the mediums of Examples 10 and 11 was slit into a tape of ½ inches. The reproduced output of each tape was measured by using S-VHS video tape recorder ("AG6200", manufactured by Matsushita Electric Industrial Co., Ltd.) in terms of relative value compared with the sample of Example 7 (comparison).

(2) Running Properties

The thus-obtained video tape and stainless steel pole were brought into contact with each other under a tension ($T_1$) of 50 g (winding angle: 180° C.). A tension ($T_2$) required for running the video tape at a speed of 3.3 cm/s under said condition was measured. The friction coefficient ($\mu$) of the video tape was determined from the following equation on the basis of the measured value.

$$\mu = 1/\pi \cdot \ln(T_2/T_1)$$

Tests for the determination on the friction coefficient were conducted under the condition of 25° C. and 70% RH.

(3) Durability

Test was made in still mode by using the above-described FUJIX-8. The time taken until the reproduced output became 50% of the recording signal was measured. Unloading function was released.

Each of the Mediums of Examples 10 and 11 was slit into a tape of ½ inch and evaluated by using S-VHS video tape recorder ("AG6200" manufactured by Matsushita Electric Industrial Co., Ltd.)

(4) Determination of the Content of Epoxy Group in the Polymer

The epoxy group was opened with 6N HCl under the condition of 40° C. for one hour. The remainder of HCl was back-titrated with a KOH solution.

The magnetic recording mediums (Examples 1, 8, 9, 10 and 12) obtained by the process of the present invention using a combination of the additive with the binder according to present invention have good electromagnetic properties, a low coefficient of dynamic friction and excellent still durability.

The medium (Example 2) wherein the fatty acid was added in the dispersion stage, the medium (example 3) wherein the binder having no epoxy group was used and the medium (Example 4) wherein the binder having no polar group was used, have low S/N value, high $\mu$ value and short still durability time. The medium (Example 13) wherein the ferromagnetic powder having a large crystallite size was used, has low S/N value and short still durability time.

While the invention has been described in detail and with reference to specific embodiments thereof, it is apparent to one skilled in the are that various changes and modifications can be made herein without departing from the spirit and scope of the present invention.

What is claimed is:

1. A process for producing a magnetic recording medium comprising steps of (1) kneading ferromagnetic fine powders and binders with solvents, (2) optionally adding further binders and solvents to disperse the powders and (3) coating the resulting magnetic coating composition on a non-magnetic support, wherein said ferromagnetic fine powders have a crystallite size of not larger than 500 Å, said binders have at least one polar group selected from the group consisting of $-SO_3M$, $-OSO_3M$, $-PO_3M_2$, $-OPO_3M_2$ and $-COOM$ (wherein M is hydrogen atom, an alkali metal or ammonium) and at least one epoxy ring in the molecule and a step of adding a fatty acid having 12 to 26 carbon atoms is carried out after the dispersing step (2).

2. The process for producing a magnetic recording medium as claimed in claim 1, wherein a step of crushing said ferromagnetic fine powders is additionally carried out before the kneading step (1).

3. The process for producing a magnetic recording medium as claimed in claim 1, wherein said binders have at least one of $-SO_3M$ or $-CO_2M$.

4. The process for producing a magnetic recording medium as claimed in claim 1, wherein a content of the polar group is from $1\times 10^{-7}$ to $1\times 10^{-3}$ equivalent per gram of the polymer for binders.

5. The process for producing a magnetic recording medium as claimed in claim 1, wherein said binders further have —OH group.

6. The process for producing a magnetic recording medium as claimed in claim 1, wherein a content of said epoxy ring is in the range of from $1\times 10^{-4}$ to $1\times 10^{-2}$ mol per gram of the binder.

7. The process for producing a magnetic recording medium as claimed in claim 1, wherein said binder has a weight-average molecular weight of from 20,000 to 100,000.

* * * * *